United States Patent [19]

Kamiishi et al.

[11] Patent Number: 5,266,666
[45] Date of Patent: Nov. 30, 1993

[54] PROCESS FOR PREPARING ETHYLENE POLYMERS OR COPOLYMERS

[75] Inventors: Hirohumi Kamiishi, Yokohama; Takeichi Shiraishi, Kawasaki; Kazuo Matsuura, Yokohama, all of Japan

[73] Assignee: Nippon Oil Company, Limited, Tokyo, Japan

[21] Appl. No.: 766,749

[22] Filed: Sep. 27, 1991

[51] Int. Cl.$^5$ .................... C08F 4/654; C08F 10/02
[52] U.S. Cl. .................... 526/125; 526/128; 526/142; 526/348.6; 502/126
[58] Field of Search .................... 526/125, 128, 142; 502/126

[56] References Cited

U.S. PATENT DOCUMENTS 4,701,505 10/1987 Fujii et al. .................... 526/125
4,962,167 10/1990 Shiraishi et al. .................... 526/125
4,971,937 11/1990 Albizzati et al. .................... 526/125 X

FOREIGN PATENT DOCUMENTS 0123603 9/1980 Japan .................... 526/125

Primary Examiner—Fred Teskin
Attorney, Agent, or Firm—Dilworth & Barrese

[57] ABSTRACT

Ethylene and optionally an α-olefin are polymerized in the presence of a catalyst comprising a solid catalyst component and an organometallic compound, said solid catalyst component being obtained by mutually contacting the following components:

(A) a reaction product obtained by the reaction of a magnesium halide and a compound represented by the general formula $Ti(OR^1)_4$ wherein $R^1$ is a hydrocarbon radical having 1 to 20 carbon atoms;

(B) a reaction product obtained by the reaction of an aluminum halide and a compound represented by the general formula $Si(OR^2)_4$ wherein $R^2$ is a hydrocarbon radical having 1 to 20 carbon atoms; and (C) a compound represented by the following general formula:

$$R^3O(CH_2CHO)_mR^5$$
$$\phantom{R^3O(CH_2C}|$$
$$\phantom{R^3O(CH_2CHO)_m}R_4$$

wherein $R^3$ and $R^5$, which may be the same or different, are each a hydrocarbon radical having 1 to 20 carbon atoms, $R^4$ is a hydrogen atom or an alkyl group having 1 to 20 carbon atoms, and m is an integer in the range of $1 \leq m \leq 100$, with the proviso that, in the case of $m \geq 2$, $R^4$s may be the same or different.

8 Claims, No Drawings

PROCESS FOR PREPARING ETHYLENE POLYMERS OR COPOLYMERS

BACKGROUND OF THE INVENTION

The present invention relates to a process for preparing polymers or ethylene/α-olefin copolymers. More particularly, the present invention is concerned with a process of preparing ethylene polymers or ethylene/α-olefin copolymers improved in bulk density, narrow in particle size distribution and superior in polymerization operability by using a catalyst comprising a specific solid catalyst component and an organometallic compound.

Heretofore, as polyethylene preparing processes there have been known various processes using catalysts comprising various inorganic magnesium compounds such as magnesium halide, magnesium oxide and magnesium hydroxide as carriers and transition metal compounds such as titanium and vanadium supported on the carriers. However, in the case where these known catalysts are used in the preparation of so-called ultra-high molecular weight polyethylenes, the resulting ultra-high molecular weight polyethylenes are generally low in bulk density, wide in particle size distribution and inferior in the polymerization operability due to fouling and the formation of coarse particles during the polymerization.

Further, in the production of ultra-high molecular weight polyethylene fibers by a gel spinning process for which there has been an increasing demand recently, or in uniform molding, it is now absolutely necessary to use an ultra-high molecular weight polyethylene high in bulk density, narrow in particle size distribution and superior in fluidity.

It is the object of the present invention to overcome the above-mentioned problems of the prior art.

Having made extensive studies, the present inventors found out surprisingly that the conventional drawbacks could be overcome by preparing a polyethylene using a catalyst comprising a specific solid catalyst component and an organometallic compound as will be described below.

SUMMARY OF THE INVENTION

The present invention resides in a process of preparing an ethylene polymer or a copolymer of ethylene and α-olefin having 3 to 12 carbon atoms, using a catalyst comprising a solid catalyst component and an organometallic compound, the solid catalyst component being obtained by mutually contacting the following components:

(A) a reaction product obtained by the reaction of a magnesium halide and a compound represented by the general formula $Ti(OR^1)_4$ wherein $R^1$ represents a hydrocarbon radical having 1 to 20 carbon atoms;

(B) a reaction product obtained by the reaction of an aluminum halide and a compound represented by the general formula $Si(OR^2)_4$ wherein $R^2$ represents a hydrocarbon radical having 1 to 20 carbon atoms; and (C) a compound represented by the following generl formula:

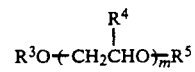

wherein $R^3$ and $R^5$, which may be the same or different, each represent a hydrocarbon radical having 1 to 20 carbon atoms, RP4 represents a hydrogen atom or an alkyl group having 1 to 20 carbon atoms, and m is an integer in the range of $1 \leq m \leq 100$, with the proviso that, in the case of $m \geq 2$, $R^4$s may be the same or different.

The ethylene polymer or copolymer preparing process using the specific catalyst according to the present invention has the following excellent features.

(1) Not only in preparing an ethylene polymer or copolymer having a normal range of molecular weight but also in preparing an ultra-high molecular weight polyethylene, there is obtained in high activity a polymer having a narrow particle size distribution, a relatively spherical shape and a high free fluidity.

(2) Not only an ethylene polymer or copolymer having a normal range of molecular weight but also an ultra-high molecular weight polyethylene can be prepared efficiently in good operating condition of the polymerization rection without fouling in the polymerization reactor and without blocking of a polymer withdrawing port caused by the formation of coarse particles.

DETAILED DESCRIPTION OF THE INVENTION

The present invention will be described in detail hereinunder.

As the magnesium halide used in the present invention there is used a substiatially anhydrous one. Examples are magnesium difluoride, magnesium dichloride, magnesium dibromide, magnesium diiodide, and mixture thereof, with magnesium dichloride being particularly preferred.

These magnesium halides may have been treated with electron donors such as alcohols, esters, ketones, carboxylic acids, ethers, amines, or phosphines.

As the titanium compound there is preferbly used a compund represented by the general formula $Ti(OR)_4$ wherein R is a hydrocarbon radical having 1 to 20, preferably 1 to 8, carbon atoms such as, for example, an alkyl, aryl or aralkyl group. Examples are tetramethoxytitanium, tetraethyoxytitanium, tetraisopropoxytitanium, tetrapropoxytitanium, tetrabutoxytitanium, tetrapentoxytitanium, tetrahexyloxytitanium, tetra-2-ethylhexyloxytitanium, tetraphenoxytitanium, and tetrabenzyloxytitanium, with tetrabutoxytitanium being particularly preferred.

The method of reaction between the magnesium halide and the titanium compound is not specially limited. Preferably, both are mixed and reacted under heating in an inert hydrocarbon solvent (e.g. hexane, heptane, toluene, or cyclohexane) at a temperature of 20° to 200° C., more preferably 50° to 200° C., for 5 minutes to 10 hours, more preferably 10 minutes to 2 hours. Of course, these operations should be performed in an inert gas atmosphere (e.g. nitrogen or helium) and moisture should be avoided.

The reaction ratio of the magnesium halide to the tatanium compound is in the range of 0.05 to 10, preferably 0.1 to 5, in terms of Mg/Ti (mole ratio).

As the aluminum halide used in the present invention there is used a substantially anhydrous one. Examples are aluminum trifluoride, aluminum trichloride, aluminum tribromide, aluminum triiodide, and mixtures thereof, with aluminum chloride being particularly preferred.

As the silicon compound there is preferably used a compound represented by the general formula Si(OR')$_4$ wherein R' is a hydrocarbon radical such as, for example, an alkyl, aryl or aralkyl group having 1 to 20, preferably 1 to 10, carbon atoms. Examples are Si(OCH$_3$)$_4$, Si(OC$_2$H$_5$)$_4$, Si(On—C$_3$H$_7$)$_4$, Si(On—C$_4$H$_9$)$_4$, Si(O—C$_8$H$_{17}$)$_4$, Si(OC$_{10}$H$_{21}$)$_4$, Si(OC$_6$H$_5$)$_4$, and Si(OCH$_2$C$_6$H$_5$)$_4$, with Si(OC$_2$H$_5$)$_4$ being particularly preferred.

The method of reaction between the aluminum halide and the silicon compound is not specially limited. Preferably, both are mixed and reacted under heating in an inert hydrocarbon solvent (e.g. hexane, heptane, toluene, or cyclohexane) at a temperture of 20° to 200° C., more preferably 50° to 200° C., for 5 minutes to 10 hours, more preferably 10 minutes to 2 hours. Of course, these operations should be carried out in an inert gas atmosphere (e.g. nitrogen or helium) and moisture should be avoided.

The reaction ratio of the aluminum halide to the silicon compound is in the range of 0.01 to 10, preferably 0.1 to 5, in terms of Al/Si (mole ratio).

In the compound of the general formula

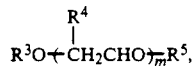

R$^3$ and R$^5$, which may be the same or diferent, are each a hydrocarbon radical having 1 to 20, preferably 1 to 10, carbon atoms. Examples of such hydrocarbon radical include alkyl groups such as methyl, ethyl, propyl and butyl, aryl groups such as phenyl and tolyl, and aralkyl groups such as benzyl. In the same formula, R$^4$ is a hydrogen atom or an alkyl group having 1 to 20, preferably 1 to 10, carbon atoms, examples of which include methyl, ethyl, propyl and butyl, and m is an integer in the range of $1 \leq m \leq 200$, preferably $1 \leq m \leq 100$, more preferably $1 \leq m \leq 80$. In the case of $m \geq 2$, R$^4$s may be the same or different. Thus, in the compounds of the above general formula there are included not only compounds each having a single alkylene oxide structure but also compounds (so-called copolymers) each having plural kinds of alkylene oxide structures.

As examples of the compound of the above general formula used in the invention there are mentioned ethylene glycol dimethyl ether, ethylene glycol diethyl ether, diethylene glycol dimethyl ether, diethylene glycol diethyl ether, diethylene glycol dibutyl ether, diethylene glycol methyltert-butyl ether, tridiethylene glycol dimethyl ether, triethylene glycol diethyl ether, tetraethylene glycol dimethyl ether, tetraethylene glycol diethyl ether, polyethylene glycol dimethyl ether, polyethylene glycol diethyl ether, polyethylene glycol dioctyl ether, propylene glycol dimethyl ether, propylene glycol diethyl ether, dipropylene glycol dimethyl ether, dipropylene glycol diethyl ether, tripropylene glycol dimethyl ether, tripropylene glycol diethyl ether, tetrapropylene glycol dimethyl ether, tetrapropylene glycol diethyl ether, polypropylene glycol dimethyl ether, polypropylene glycol diethyl ether, polypropylene glycol dbutyl ether, polybutylene glycol dimethyl ether, polybutylene glycol diethyl ether, poly(oxyethyleneoxypropylene)dimethyl ether, and poly(oxyethylene-oxypropylene) diethyl ether.

The solid catalyst component used in the present invention is obtained by mutually contacting the reaction product (hereinafter referred to as component (A)) of the magnesium halide and the compound of the general formula Ti(OR$^1$)$_4$, the reaction product (component (B) hereinafter) and the compound (component (C) hereinafter) of the general formula

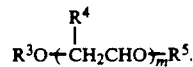

These components may be contacted with one another in any of the following orders.

1) Components (A) and (B) are contacted together in advance, followed by further contact with component (C).

2) Components (A) and (C) are contacted together in advance, followed by further contact with component (B).

3) Components (B) and (C) are contacted together in advance, followed by further contact with component (A).

4) Components (A), (B) and (C) are contacted together at a time.

According to the mutual contact conducted in the present invention, in the above contacting method 2) there are also included ① a method wherein component (C) is contacted with the reaction product of the magnesium halide and the compound of the general formula Ti(OR$^1$)$_4$, ② a method wherein the magnesium halide and component (C) are contacted together in advance, followed by reaction with the compound of the general formula Ti(OR$^1$)$_4$, and ③ a method wherein the compound of the general formula Ti(OR$^1$)$_4$ and component (C) are contacted together in advance, followed by reaction with the magnesium halide, and in the above contacting method 3) there are also included ① a method wherein component (C) is contacted with the reaction product of the aluminum halide and the compound of the general formula Si(OR$^2$)$_4$, ② a method wherein the aluminum halide and component (C) are contacted together in advance, followed by reaction with the compound of the general formula Si(OR$^2$)$_4$, and ③ a method wherein the compound of the general formula Si(OR$^2$)$_4$, and component (C) are contacted together in advance, followed by reaction with the aluminum halide.

The above contacting methods 2)-① and 3)-③ are particularly preferred in the present invention.

How to contact the components (A), (B) and (C) is not specially limited. Preferably, these components are mixed and reacted under heating in an inert hydrocarbon solvent (e.g. hexane, heptane, toluene, or cyclohexane) at a temperature usually in the range of 0° to 200° C., preferably 20° to 150° C., usually for 5 minutes to 10 hours, preferably 10 minutes to 2 hours. More preferably, the said reaction is followed by washing using an inert hydrocarbon solvent. Of course, it is desirable to carry out these operations in an inert gas atmosphere, and moisture should be avoided.

As to the proportions of components (A), (B) and (C), the component (B) is used in an amount of usually 0.01 to 20 g, preferably 0.1 to 10 g, more preferably 0.5 to 5 g, per gram of component (A), and the component (C) is used in an amount of usually 0.001 to 40 mg, preferably 0.01 to 20 ml, more preferably 0.1 to 10 ml, per gram of the magnesium halide in component (A).

The solid catalyst component thus prepared is combined with an organometallic compound for use in preparing an ethylene polymer of an ethylene/α-olefin copolymer.

As the organometallic compound used in the present invention there may be used any of organometallic compounds of Group I to Group IV metals in the Periodic Table each known as a component of a Ziegler type catalyst. Particularly, organoaluminum compounds and organozinc compounds are preferred. Examples are organoaluminum compounds of the general formulae $R_3Al$, $R_2AlX$, $RAlX_2$, $R_2AlOR$, $RAl(OR)X$ and $R_3Al_2X_3$ wherein Rs, which may be same or different, are each an alkyl or aryl group having 1 to 20 carbon atoms, and X is a halogen atom, as well as organozinc compounds of the general formula $R_2Zn$ wherein Rs, which may the same or different, are each an alkyl group having 1 to 20 carbon atoms. More concrete examples are triethylaluminum, triisopropylaluminum, triisobutylaluminum, tri-sec-butylaluminum, tri-tert-butylaluminum, trihexylaluminum, trictylaluminum, diethylaluminum chloride, diisopropylaluminum chloride, diethylaluminum ethoxide, ethylaluminum sesquichloride, diethylzinc, and mixtures thereof. A combined use of triethylaluminum and diethylaluminum chloride is preferred.

The amount of the organometallic compound is not specially limited, but usually it is in the range of 0.1 to 1000 moles per mole of the titanium compound.

The organometallic compound component may be used as a mixture or addition compound of the organometallic compound and an organic acid ester.

In the case of using a mixture of the organometallic compound and an organic acid ester, the organic acid ester is used in an amount of usually 0.1 to 1 mole, preferably 0.2 to 0.5 moles, per mole of the organometallic compound. In the case of using an addition compound of the organometallic compound and an organic acid ester, it is preferable that both be used in an organometallic compound: organic acidester mole ratio in the range from 2:1 to 1:2.

The organic acid ester is the ester of a saturated or unsaturated, mono- or dibasic, organic carboxylic acid having 1 to 24 carbon atoms and an alcohol having 1 to 30 carbon atoms. Examples are methyl formate, ethyl acetate, amyl acetate, phenyl acetate, octyl acetate, methyl methacrylate, ethyl stearate, methyl benzoate, ethyl benzoate, n-propyl benzoate, iso-propyl benzoate, butyl benzoate, hexyl benzoate, cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinol carboxylate, methyl anisate, ethyl anisate, phenyl anisate, benzyl anisate, methyl p-ethoxybenzoate, methyl p-toluylate, ethyl p-toluylate, phenyl p-toluylate, ethyl m-toluylate, methyl p-aminobenzoate, ethyl p-aminobenzoate, vinyl benzoate, allyl benzoate, benzyl benzoate, methyl naphthoate, and ethyl naphthoate.

Particularly preferred are alkyl esters, especially methyl and ethyl esters, of benzoic acid, o- or p-toluic acid and anisic acid.

According to the present invention, using the catalyst described above, there is obtained a homopolymer of ethylene or a copolymer of ethylene and an α-olefin having 3 to 12, preferably 3 to 6, carbon atoms. The α-olefin content in the copolymer is not specially limited, but the α-olefin content in the copolymerization of ethylene and the α-olefin is usually not higher than 40 mole %, preferably not higher than 20 mole %, more preferably not higher than 10 mole %, particularly preferably not higher than 5 mole %. Copolymerization with dienes is also preferable for the modification of the ethylene polymer or copolymer. Examples of dienes employable in the invention include butadiene, 1,4-hexadiene, ethylidene norbornene, and dicyclopentadiene.

The homopolymerization of ethylene or the copolymerization of ethylene and an α-olefin using the catalyst of the present invention can be carried out in the form of slurry polymerization, solution polymerization, or vapor phase polymerization. The catalyst used in the present invention is particularly suitable for slurry polymerization. The polymerization reaction is conducted in the same way as in the conventional olefin polymerization reaction using a Ziegler type catalyst. More particularly, the reaction is performed in a substantially oxygen- and water-free condition in the presence of an inert hydrocarbon and in the presence or absence of hydrogen, whereby ethylene is polymerized or ethylene and α-olefin are copolymerized to prepare an ethylene polymer or copolymer. In this case, polymerizing conditions involve temperataures in the range of 0° to 120° C., preferably 20° to 100° C., and pressures in the range of 0 to 70 kg/cm$^2$·G, preferably 0 to 60 kg/cm$^2$·G. Examples of the inert hydrocarbon include saturated hydrocarbons such as butane, pentane, hexane, heptane, octane and cyclohexane, and aromatic hydrocarbons such as benzene, toluene and xylene. Further, where required in the molding of the resulting ultra-high molecular polyethylene, there are also mentioned such high-boiling organic solvents as decalin, tetralin, decane and kerosene.

Of course, using the catalyst of the present invention, there can be performed two or more multi-stage polymerization reactions involving different polymerization conditions such as different hydrogen concentrations and different polymerization temperatures.

According to the present invention, it is possible to prepare an ethylene polymer or an ethylene/α-olefin copolymer of a desired molecular weight. Particularly, the process of the present invention is suitable for the production of an ultra-high molecular weight ethylene polymer or ethylene/α-olefin copolymer (so-called ultra-high molecular weight polyethylene) having an extremely high molecular weight. Adjustment of the molecular weight can be done to some extent by changing polymerization conditions such as the polymerization temperature and the composition ratio of the catalyst, but the addition of hydrogen into the polymerization system is more effective for this purpose. The hydrogen concentration in the preparation of an ultra-high molecular weight ethylene polymer or copolymer is not specially limited, but it is usually in the range of 0 to 20 mole %, preferably 0 to 10 mole %. The "ultra-high molecular weight ethylene polymer or copolymer" as referred to herein indicates a polymer or copolymer having an intrinsic viscosity in decaline of 5 to 50 dl/g, preferably 8 to 40 dl/g, more preferably 10 to 30 dl/g, and a viscosity average molecular weight of 500,000 to 1,200,000, preferably 900,000 to 9,000,000, more preferably 1,200,000 to 6,000,000.

According to the present invention there is provided a manufacturing process which, not only in the preparation of an ethylene polymer or copolymer of a normal molecular weight but also in the preparation of an ultra-high molecular weight polyethylene, can afford in high activity a polymer having a high bulk density, a small average particle diameter, a narrow particle size distribution, a relatively spherical shape and a good fre fluidity, with neither fouling in the polymerization reactor nor blocking of the polymer withdrawing port caused by the formation of coarse particles, and that in good operating condition of the polymerization reaction.

EXAMPLES

The following examples are given to illustrate the present invention more concretely, but it is to be understood that the invention is not limited thereto.

EXAMPLE 1

(a) Preparation of Solid Catalyst Component 2.5 g of $MgCl_2$ and 18 ml of tetrabutoxytitanium were placed in a thoroughly dried, 100 ml flask in a nitrogen atmosphere and reaction was allowed to take place at 90° C. for 2 hours with stirring. The temperature was reduced to 50° C., then 0.06 ml of diethylene glycol dimethyl ether was added into the reaction product and stirring was made for 10 minutes. The reaction product thus obtained is assumed equal to components (A)+(B).

Then, 20 g of $AlCl_3$ and 30 ml of n-heptane were charged into a thoroughly dried 300 ml flask in a nitrogen atmosphere, then 40 ml of $Si(OC_2H_5)_4$ was dropwise added slowly under stirring and the temperature was raised to 80° C., allowing reaction to take place for 2 hours, followed by cooling to 40° C. slowly. The reaction product thus obtained is assumed to be component (B).

The components (A)+(B) were dropwise added slowly into the component (B) while the component (B) was stirred at 40° C. Thereafter, the temperature was reduced to room temperture and supernatant liquid was removed by decantation, followed by washing with five 200 ml portions of hexane. As a result, there was obtained a solid catalyst component containing 1.7 wt % of titanium.

(b) Polymerization of Ethylene 1,000 ml of hexane, 1.0 mmol of triethylaluminum, 1.0 mmol of diethylaluminum monochloride and 10 mg of the solid catalyst component prepared above were charged in this order into a 2 liter autoclave at room temperature in a nitrogen atmosphere. Thereafter, the temperature was raised to 65° C. and ethylene was introduced under pressure to maintain the total pressure at 10 kg/cm²·G. In this condition, polymerization was conducted for 3 hours to obtain an ethylene polymer. Catalytic acitvity was 5,700 g·polyethylene/g·solid catalyst·hr·$C_2H_4$ pressure.

(c) Evaluation of Physical Properties

The ethylene polymer prepared above had an intrinsic viscosity of 17.11 dl/g, a high bulk density of 0.42 g/cm², a small average particle diameter of 185 μm and a narrow Span value of 0.4 as a value indicating the width of particle size distribution, thus exhibiting a high free fluidity.

How to determine Span Value

Using eight kinds of sieves having nominal sizes of 44μ, 88μ, 125μ, 177μ, 250μ, 350μ, 710μ and 1,410μ, there were obtained sieve residues (wt %) in accordance with JIS K0069, from which there was prepared a particle size distribution curve (a wt %—particle size relation curve), and Span value was determined by the following equation:

$$\text{Span value} = \frac{P_{90} - P_{10}}{P_{50}}$$

$P_{90}$ : particle size at 90 wt %
$P_{10}$ : particle size at 10 wt %
$P_{50}$ : particle size at 50 wt %

The results of evaluation of the physical properties are as shown in Table 1.

EXAMPLE 2

An ethylene polymer was prepared in the same way as in Example 1 except that the diethylene glycol dimethyl ether as component (C) was replaced by tetraethylene glycol dimethyl ether and that the amount of $AlCl_3$ in component (B) was changed 20 g. The ethylene polymer was then evaluated for physical properties, the results of which are as shown in Table 1.

EXAMPLE 3

An ethylene polymer was prepared in the same way as in example 1 except that the diethylene glycol dimethyl ether as component (C) was replaced by polyethylene glycol 400 dimethyl ether. The ethylene polymer was then evaluated for physical properties, the results of which are as shown in Table 1.

EXAMPLE 4

An ethylene polymer was prepared in the same way as in Example 1, except that the diethylene glycol dimethyl ether as component (C) was replaced by tetraethylene glycol dimethyl ether and that this was added into a reaction solution of 15 g $AlCl_3$ and 40 ml $Si(OC_2H_5)_4$ as component B. The ethylene polymer was then evaluated for physical properties, the results of which are as shown in Table 1.

EXAMPLE 5

An ethylene polymer was prepared in the same way as in Example 1 except that the tetraethylene glocol dimethyl ether as component (C) was added 0.03 ml to component (A) and also 0.03 ml to component (B). The ethylene polymer was then evaluated for physical properties, the results of which are as shown in Table 1.

COMPARATIVE EXAMPLE 1

An ethylene polymer was prepared in the same way as in Example 1 except that the diethylene glycol dimethyl ether as component (C) was not added and that there was used 20 g of $AlCl_3$ in component (B). The results of evaluation of its physical properties are as shown in Table 1.

COMPARATIVE EXAMPLE 2

An ethylene polymer was prepared in the same manner as in Example 1 except that the diethylene glycol dimethyl ether as component (C) was not added. The results of evaluation of its physical properties are as shown in Table 1.

COMPARATIVE EXAMPLE 3

An ethylene polymer was prepared in the same manner as in Example 1 except that the diethylene glycol dimethyl ether as component (C) was not added and that there was used 15 g of AlCl$_3$ in component (B). The results of evaluation of its physical properties are as shown in Table 1.

EXAMPLE 6

The procedure of Example 1 was repeated except that copolymerization was conducted while 2 g of propylene and ethylene were introduced up to a total pressure of 10 gk/cm$^2$·G. The results of evaluation of its physical properties are as shown in Table 1.

EXAMPLE 7

The procedure of Example 1 was repeated except that 10 g of butene-1 was added in the step (6). The results of evaluation of the polymer thus obtained are as shown in Table 1.

EXAMPLE 8

The procedure of Example 10 was repeated except that the tetrabutoxytitanium as component (A) was replaced by tetramethoxytitanium (Ti(OMe)$_4$). The results of evaluation of the polymer thus obtained are as shown in Table 1.

EXAMPLE 9

The procedure of Example 1 was repeated except that the tetrabutoxytitanium as component (A) was replaced by tetrapropoxytitanium as component (A) was replaced by tetrapropoxytitanium (Ti(OPr)$_4$). The results of evaluation of the polymer thus obtained ae as shown in Table 1.

EXAMPLE 10

The procedure of Example 1 was repeated except that the Si(OC$_2$H$_5$)$_4$ as component (B) was replaced by Si(OC$_3$H$_7$)$_4$. The results of evaluation of the polymer thus obtained are as shown in Table 1.

EXAMPLE 11

The procedure of Example 1 was repeated except that the Si(OC$_4$H$_5$)$_4$ as component (B) was replaced by Si(OC$_4$H$_9$)$_4$. The results of evaluation of the polymer thus obtained are as shown in Table 1.

TABLE 1

| | | | | Solid Catalyst Component | | | | | | | |
|---|---|---|---|---|---|---|---|---|---|---|---|
| | MgCl$_2$ (g) | Tetra- butoxy titan- ium (ml) | Tetra- meth- oxy titan- tanum (ml) | Tetra- pro- poxy titan- nium (ml) | Diethy- lene glycol di- methyl ether (ml) | Tetra- thylene glycol di- methyl ether (ml) | Poly ethylene glycol 400 dimethyl ether (ml) | AlCl$_3$ (g) | Si(OC$_2$H$_5$)$_4$ (ml) | Si(OC$_2$H$_7$)$_2$ (ml) | Si(OC$_4$H$_9$)$_4$ (ml) | Tetra- ethylene glycol dimethyl ether (ml) |
| Example 1 | 2.5 | 18 | — | — | 0.06 | — | — | 10 | 40 | — | — | — |
| Example 2 | 2.5 | 18 | — | — | — | 0.06 | — | 20 | 40 | — | — | — |
| Example 3 | 2.5 | 18 | — | — | — | — | 0.06 | 10 | 40 | — | — | — |
| Example 4 | 2.5 | 18 | — | — | — | — | — | 15 | 40 | — | — | 0.06 |
| Example 5 | 2.5 | 18 | — | — | — | 0.03 | — | 10 | 40 | — | — | 0.03 |
| Example 6 | 2.5 | 18 | — | — | 0.06 | — | — | 10 | 40 | — | — | — |
| Example 7 | 2.5 | 18 | — | — | 0.06 | — | — | 10 | 40 | — | — | — |
| Example 8 | 2.5 | — | 10 | — | 0.06 | — | — | 10 | 40 | — | — | — |
| Example 9 | 2.5 | — | — | 15 | 0.06 | — | — | 10 | 40 | — | — | — |
| Example 10 | 2.5 | 18 | — | — | 0.06 | — | — | 10 | — | 50 | — | — |
| Example 11 | 2.5 | 18 | — | — | 0.06 | — | — | 10 | — | — | 60 | — |
| Comparative Example 1 | 2.5 | 18 | — | — | — | — | — | 20 | 40 | — | — | — |
| Comparative Example 2 | 2.5 | 18 | — | — | — | — | — | 10 | 40 | — | — | — |
| Comparative Example 3 | 2.5 | 18 | — | — | — | — | — | 15 | 40 | — | — | — |

| | Evaluation of Physical Properties | | | | |
|---|---|---|---|---|---|
| | Catalytic Activity g.PE/g.solid.catalyst. hr.C$_2$H$_4$ | Bulk Density g/cm$^3$ | Average Particle μm | Particle Size Distribution Span | Intrinsic Viscosity dl/g |
| Example 1 | 5700 | 0.39 | 180 | 0.4 | 17.11 |
| Example 2 | 5800 | 0.42 | 185 | 0.5 | 17.30 |
| Example 3 | 5100 | 0.41 | 200 | 0.4 | 16.85 |
| Example 4 | 5050 | 0.40 | 200 | 0.5 | 16.70 |
| Example 5 | 5200 | 0.40 | 200 | 0.5 | 16.80 |
| Example 6 | 5100 | 0.39 | 170 | 0.5 | 16.80 |
| Example 7 | 7200 | 0.40 | 190 | 0.4 | 14.90 |
| Example 8 | 4300 | 0.38 | 200 | 0.5 | 16.80 |
| Example 9 | 4500 | 0.37 | 210 | 0.5 | 17.20 |
| Example 10 | 5200 | 0.37 | 210 | 0.5 | 16.70 |
| Example 11 | 4800 | 0.38 | 200 | 0.5 | 16.90 |
| Comparative Example 1 | 5500 | 0.34 | 245 | 1.4 | 16.60 |
| Comparative Example 2 | 4400 | 0.31 | 230 | 1.2 | 16.00 |

TABLE 1-continued

| | | | | |
|---|---|---|---|---|
| Comparative Example 3 | 5100 | 0.33 | 240 | 1.1 | 16.51 |

What is claimed is:

1. A process for preparing an ethylene polymer or a copolymer of ethylene and an α-olefin having 3 to 12 carbon atoms, the process comprising polymerizing ethylene or ethylene and α-olefin in the presence of a catalyst comprising a solid catalyst component and an organometallic compound, said solid catalyst component being obtained by mutually contacting the following components:

(A) a reaction product obtained by the reaction of a magnesium halide and a compound represented by the general formula Ti(OR$^1$)$_4$ wherein R$^1$ is a hydrocarbon radical having 1 to 20 carbon atoms;

(B) a reaction product obtained by the reaction of an aluminum halide and a compound represented by the general formula Si(OR$^2$)$_4$ wherein R$^2$ is a hydrocarbon radical having 1 to 20 carbon atoms; and (C) a compound represented by the following general formula:

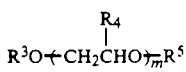

$$R^3O+CH_2CHO)_{m}R^5$$

wherein R$^3$ and R$^5$, which may be the same or different, are each a hydrocarbon radical having 1 to 20 carbon atoms, R$^4$ is a hydrogen atom or an alkyl group having 1 to 20 carbon atoms, and m is an integer in the range of $1 \leq m \leq 100$, with the proviso that, in the case of $m \geq 2$, R$^4$s may be the same or different.

2. A process of claim 1 wherein the ratio of the magnesium halide to the titanium compound is in the range of 0.05 to 10 in terms of Mg/Ti mole ratio.

3. A process of claim 1 wherein the ratio of the aluminum halide to the silicon compound is in the range of 0.01 to 1 in terms of Al/Si mole ratio.

4. A process of claim 1 wherein the components (A), (B) and (C) are contacted with one another in an inert solvent simultaneously or in consecutive order.

5. A process of claim 1 wherein the component (B) is used in an amount of 0.01 to 20 g per gram of component (A), and the component (C) is used in an amount of 0.001 to 40 ml per gram of the magnesium halide in the component (A).

6. A process of claim 1 wherein the organometallic compound is an organoaluminum compound.

7. A process of claim 1 wherein the organometallic compound is used together with an organic acid ester.

8. A process of claim 1 wherein the polymerization reaction is conducted at a temperture of 20° C. to 120° C. and a pressure of atomospheric pressure to 70 kg/cm$^2$.

* * * * *

UNITED STATES PATENT AND TRADEMARK OFFICE
CERTIFICATE OF CORRECTION

PATENT NO. : 5,266,666
DATED : November 30, 1993
INVENTOR(S) : Kamiishi et al.

It is certified that error appears in the above-identified patent and that said Letters Patent is hereby corrected as shown below:

Cover Page, Column 1, after line
    [22] Filed: Sept. 27, 1991
Insert:
    -- [30] Foreign Application Priority Data
    October 5, 1990 [JP] Japan........2- 266421/1990--.

Signed and Sealed this

Twenty-sixth Day of April, 1994

Attest:

BRUCE LEHMAN

Attesting Officer      Commissioner of Patents and Trademarks